(12) United States Patent
Beckmann

(10) Patent No.: US 6,471,908 B1
(45) Date of Patent: Oct. 29, 2002

(54) METHOD FOR THE FABRICATION OF SYNTHETIC-MATERIAL COMPONENT ASSEMBLIES

(75) Inventor: Friedhelm Beckmann, Hiddenhausen (DE)

(73) Assignee: Möller Plast GmbH, Bielefeld (DE)

( * ) Notice: Subject to any disclaimer, the term of this patent is extended or adjusted under 35 U.S.C. 154(b) by 0 days.

(21) Appl. No.: 09/379,217

(22) Filed: Aug. 23, 1999

Related U.S. Application Data

(63) Continuation of application No. PCT/DE98/00016, filed on Jan. 7, 1998.

(30) Foreign Application Priority Data

Feb. 21, 1997 (DE) .......................................... 197 06 849

(51) Int. Cl.$^7$ .............................................. B29C 49/22
(52) U.S. Cl. ...................................... 264/515; 264/516
(58) Field of Search ................................. 264/515, 516

(56) References Cited

U.S. PATENT DOCUMENTS 5,169,470 A * 12/1992 Goldberg ............... 156/244.14
5,194,305 A * 3/1993 Shirahata et al. ............. 428/31
6,136,259 A * 10/2000 Puffenberger et al. ...... 264/515

* cited by examiner

Primary Examiner—Suzanne E. McDowell
(74) Attorney, Agent, or Firm—Laurence A. Greenberg; Werner H. Stemer; Gregory L. Mayback

(57) ABSTRACT

A method for the fabrication of synthetic-material component assemblies includes blow-molding synthetic-material components having a foam-backed decorative layer on part of their surface. Decorative material is initially pressed against a foam layer having one surface which has been heated and melted. During blow-molding of the component from an extruded synthetic-material tube, a composite decorative element produced in this way is pressed against an outer surface of the component and joined by fusion welding. The composite decorative element can either be performed in accordance with the contours of the component or have a flat structure, in which case it can be shaped, possibly with additional heating, together with the component during blow-molding.

10 Claims, 1 Drawing Sheet

US 6,471,908 B1

METHOD FOR THE FABRICATION OF SYNTHETIC-MATERIAL COMPONENT ASSEMBLIES

CROSS-REFERENCE TO RELATED APPLICATION

This application is a continuation of copending International Application No. PCT/DE98/00016, filed Jan. 7, 1998, which designated the United States.

BACKGROUND OF THE INVENTION

Field of the Invention

The invention relates to a method for the fabrication of synthetic-material component assemblies having components which are formed by blow-molding and are preferably coated with a decorative material at parts of their surface.

In order to achieve a visually and tactilely attractive surface, components fabricated from synthetic material by the process of blow-molding are coated with a decorative material which is backed in addition with a layer of foamed material in order to improve the tactile qualities, for example through the use of a soft, flexible yielding surface.

Normally, the components are fabricated in a first process step from an extruded synthetic-material tube by the extrusion blow-molding process. Components formed in that way are known to possess a high rigidity and it is possible during the blow-molding process to mold on diverse functional elements such as air channels, mechanical guides, devices for fixing, pockets and the like, at the same time.

The decorative material is attached by gluing during a second process step. However, that step is complicated since the surface of the component must be activated when using polypropylene in order to ensure the adhesive properties. The application of the glue to specific parts of the surface also presents difficulties since for that purpose it is necessary to use templates or to protect the border or edge areas of the component from glue.

In addition to the complicated working procedure, prior art methods for the fabrication of synthetic-material components with decorative surfaces have the further disadvantage that a simple recycling of used components is not guaranteed.

SUMMARY OF THE INVENTION

It is accordingly an object of the invention to provide a method for the fabrication of synthetic-material component assemblies having components in the form of blow-molded parts coated on parts of their surface, which overcomes the hereinafore-mentioned disadvantages of the heretofore-known methods of this general type and which enables coating with a decorative surface to be performed exactly, even in border or edge areas, and with little outlay.

With the foregoing and other objects in view there is provided, in accordance with the invention, a method for the fabrication of synthetic-material component assemblies, which comprises initially pressing a decorative material in a cold or heated state to produce a composite decorative element; inserting the composite decorative element in a blow-molding die; and blow-molding a component in the blow-molding die while pressing and fusing the composite decorative element to coat at least part of an outer surface of the component.

In this way, synthetic-material components with decorative areas backed with foamed material can be fabricated rapidly, with little work outlay and to a high quality.

In accordance with another mode of the invention, the prefabricated composite decorative element can already be preformed to the contour of the relevant component.

In accordance with a further mode of the invention, the composite decorative element is pressed together flat and then, after being previously heated if necessary, is shaped during blow-molding together with the component to be formed and combined with the outer surface thereof at the same time.

In accordance with an added mode of the invention, the shaping in the blow-molding die or of the pre-shaped composite decorative element takes place in such a way that during blow-molding a decorative groove is formed in the component, namely in a region corresponding to a peripheral edge of the composite decorative element, into which decorative groove the bent-over edge of the composite decorative element is recessed.

In accordance with an additional mode of the invention, the synthetic-material component including the decorative coating backed with foamed material is formed from a single-material system of polypropylene, and the composite decorative element is formed of polypropylene textile as the decorative material and of extruded and/or expanded polypropylene as the backing of foamed material. It is also possible, however, to use thermoplastic polyolefin and the like, or synthetic leather, leather and similar material, as the decorative material.

Thus, according to this method, it is possible to fabricate partially coated components which not only meet the high requirements of aesthetic construction, tactile quality and durability but also satisfy the need for simple recycling and which, in addition, can be fabricated with little outlay.

Other features which are considered as characteristic for the invention are set forth in the appended claims.

Although the invention is illustrated and described herein as embodied in a method for the fabrication of synthetic-material component assemblies, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
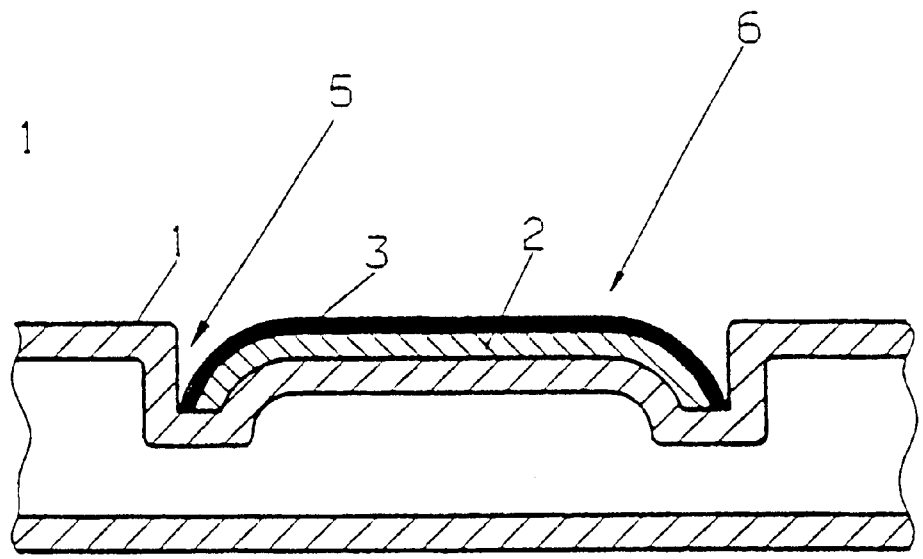
FIG. 1 is a fragmentary, diagrammatic, cross-sectional view of a double-walled component fabricated by a blow-molding process with a surface decoration backed with foamed material attached to part of its surface.

Referring now to the figures of the drawings in detail and first, particularly, to FIG. 1 thereof, it is seen that part of a surface of a double-walled component or blow-molded part 1 of synthetic material is coated with a decorative material 3 which is backed by a layer 2 of foamed material. Whereas the decorative material 3 is disposed purely for purposes of appearance, the layer 2 of foamed material serves to improve tactile qualities in the region of the part of the surface which is coated. In order to achieve an exactly bounded transitional region between the coated part of the surface and the uncoated surface of the component or blow-molded part 1, a decorative groove 5 is formed in the component or blow-molded part 1 in the region of an edge of the decorative material 3. A bent-over edge of the decorative material 3 including the backing or layer of foamed material 2 are enclosed in the decorative groove 5. The decorative material 3 and the backing of foamed material 2 jointly form a decorative element 6. In the particular embodiment according to FIG. 1, the component 1 is formed of polypropylene, the decorative material 3 is polypropylene textile, and extruded polypropylene foam (X-PP) is used for the layer of foamed material 2. A component which is formed in this way on the basis of polypropylene meets the aesthetic and tactile requirements that have been set and is also outstandingly suitable for later recycling.

Figure 2:
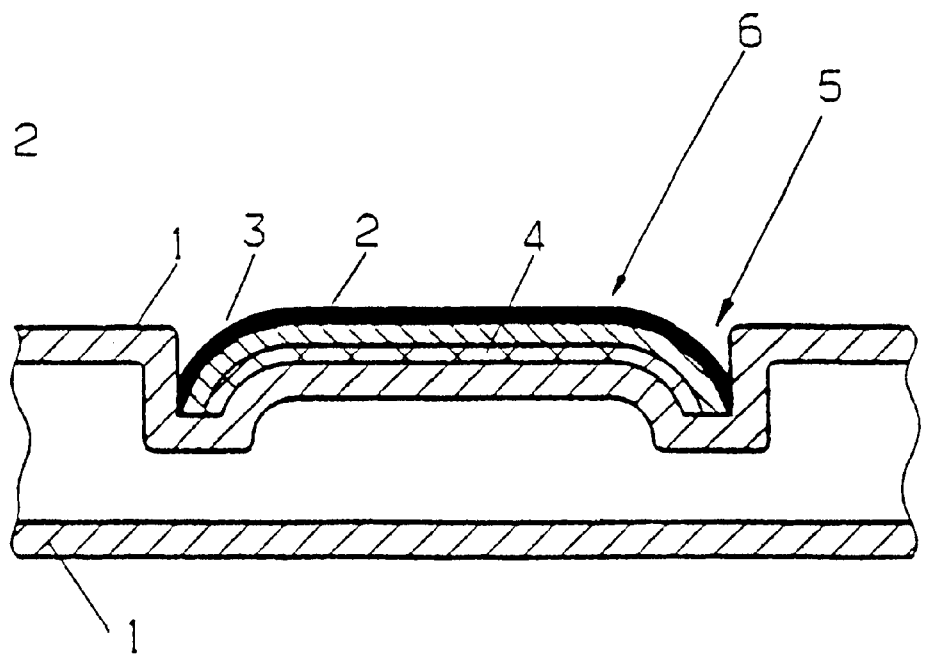
FIG. 2 is a fragmentary, cross-sectional view of a double-walled component according to FIG. 1, but with a second layer of foamed material between an outer surface of the blow-molded part (component) and decorative material.

In the embodiment shown in FIG. 2, the tactile qualities of the coated part of the surface of the component 1 are improved further through the use of first and second layers 2 and 4 of foamed material. In this case the second layer 4 of foamed material is formed of expanded polypropylene (E-PP).

The fabrication of components in the various above-described embodiments is carried out in such a way that initially an extruded and/or expanded polypropylene foam is heated at the surface to a temperature in the melting range of this material and is pressed and bonded at the molten surface with the decorative material of polypropylene textile to a composite decorative element 6 and preformed to a final contour of the component 1. During pressing, the molten polypropylene foam penetrates the surface of the decorative material and bonds firmly with it. Next, the preformed composite decorative element of foamed material and decorative material is inserted in a blow-molding die and held therein by fixing pins or a reduced pressure generated at an inner surface of the mold in the region of the composite decorative element 6.

After extrusion of a synthetic-material tube into the blow-molding die and closing of the same, air is blown into the closed synthetic-material tube. As a result, the outer wall of the synthetic-material tube with its still molten surface forms itself to the contours of the blow-molding die and the preformed composite decorative element 6, and enters into an intimate fusion-welded bond with the layer 2 of foamed material of the composite decorative element 6.

The invention is not limited to the exemplary embodiments described above. Thus other material combinations than those mentioned are also possible for the layer 2 of foamed material, and it is also possible to use thermoplastic polyolefin (TPO) films and other synthetic materials, as well as leather, synthetic leather and the like, for the decorative material.

Finally, the composite decorative element 3 can also be formed as a flat rather than as a preformed element. The flat composite decorative element, heated if necessary, is fixed in the blow-molding die and shaped during blow-molding together with the freshly extruded synthetic-material tube by the excess pressure in the tube, and is fused with the outer surface of the component 1 at the free surface of the layer 2 of foamed material.

I claim:

1. A method for the fabrication of synthetic-material component assemblies, which comprises:

initially pressing a decorative material and a foamed-material backing layer in a cold or heated state to produce a composite decorative element having an edge;

inserting the composite decorative element in a blow-molding die;

blow-molding a component in the blow-molding die while forming a decorative groove in a region of the component corresponding to the edge of the composite decorative element for receiving the edge of the composite decorative element; and pressing and fusing the composite decorative element to an outer surface of the region of the component.

2. The method according to claim 1, which comprises separately preforming a contour of the composite decorative element to correspond to a contour in the vicinity of the part of the outer surface of the component, and molding the component as an extruded synthetic-material tube onto the preformed contour during the blow-molding step.

3. The method according to claim 1, which comprises forming the composite decorative element flat and shaping the composite decorative element together with the component during the step of blow-molding the component.

4. The method according to claim 3, which comprises heating the flat formed composite decorative element before the blow-molding step.

5. The method according to claim 1, which comprises cutting the composite decorative element to shape before the blow-molding step.

6. The method according to claim 1, which comprises prefabricating the component with the decorative material and a foamed-material backing layer, from a single-material system.

7. The method according to claim 6, wherein polypropylene is used for the component, extruded or expanded polypropylene is used for the foamed-material backing layer, and a polypropylene textile is used for the decorative material.

8. The method according to claim 1, which comprises producing the composite decorative element by pressing and fusing at least two layers of foamed material of at least one of extruded and expanded polypropylene with each other and with the decorative material.

9. The method according to claim 1, which comprises selecting the decorative material from the group consisting of thermoplastic polyolefin film, other thermoplastic materials, leather, synthetic leather and textile fabric.

10. The method according to claim 1, which comprises molding surface structures into the outer surface of the component during the blow-molding step.

* * * * *